United States Patent
Murakami et al.

(10) Patent No.: US 9,570,723 B2
(45) Date of Patent: Feb. 14, 2017

(54) ELECTRIC STORAGE APPARATUS, AND METHOD FOR PRODUCING ELECTRIC STORAGE APPARATUS

(71) Applicant: GS Yuasa International Ltd., Kyoto-shi (JP)

(72) Inventors: Satoshi Murakami, Kyoto (JP); Shinsuke Yoshitake, Kyoto (JP); Yuta Yamamoto, Kyoto (JP); Yoshiyuki Honda, Kyoto (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 107 days.

(21) Appl. No.: 14/471,966

(22) Filed: Aug. 28, 2014

(65) Prior Publication Data

US 2015/0064546 A1    Mar. 5, 2015

(30) Foreign Application Priority Data

Sep. 2, 2013 (JP) .................................. 2013-181516

(51) Int. Cl.
- H01M 2/10 (2006.01)
- H01M 6/42 (2006.01)
- H01M 2/00 (2006.01)

(52) U.S. Cl.
CPC ....... *H01M 2/1077* (2013.01); *Y10T 29/49904* (2015.01); *Y10T 29/49938* (2015.01)

(58) Field of Classification Search
CPC .......................... H01M 2/1016; H01M 2/1077
(Continued)

(56) References Cited

U.S. PATENT DOCUMENTS

| 5,709,965 A | 1/1998 | Grivel et al. |
| 2002/0006545 A1 | 1/2002 | Marukawa et al. |

(Continued)

FOREIGN PATENT DOCUMENTS

| JP | H 08-83598 A | 3/1996 |
| JP | 2008-130374 A | 6/2008 |

(Continued)

OTHER PUBLICATIONS

United States Office Action dated Oct. 18, 2016 in co-pending U.S. Appl. No. 14/469,780.

*Primary Examiner* — Patrick Ryan
*Assistant Examiner* — Julian Anthony
(74) *Attorney, Agent, or Firm* — McGinn IP Law Group, PLLC.

(57) ABSTRACT

According to an embodiment, an electric storage apparatus includes an electric storage device; an insulating member arranged in alignment with the electric storage device; and a sandwiching member made of metal configured to sandwich the insulating member with the electric storage device, wherein one of the insulating member and the sandwiching member includes a recess having an opening on a first surface and having a recess-side large-diameter portion, on the bottom side, with an inner circumference larger than the opening, and the other of the insulating member and the sandwiching member includes a projection-side large-diameter portion, on the distal end side, with an outer circumference larger than the opening, the projection-side large-diameter portion being arranged inside the recess-side large-diameter portion.

16 Claims, 11 Drawing Sheets

(58) Field of Classification Search
USPC .......................................... 429/97, 151, 163
See application file for complete search history.

(56) References Cited

U.S. PATENT DOCUMENTS

| 2005/0058892 | A1* | 3/2005 | Ovshinsky | H01M 2/1077 |
| | | | | 429/120 |
| 2011/0151309 | A1* | 6/2011 | Park | H01M 2/1072 |
| | | | | 429/151 |
| 2012/0052359 | A1 | 3/2012 | Yoshitake et al. | |
| 2015/0340669 | A1 | 11/2015 | Aoki | |

FOREIGN PATENT DOCUMENTS

| JP | 2013-069657 A | 4/2013 |
| WO | WO 2010/131700 A1 | 11/2010 |

* cited by examiner

F I G . 4
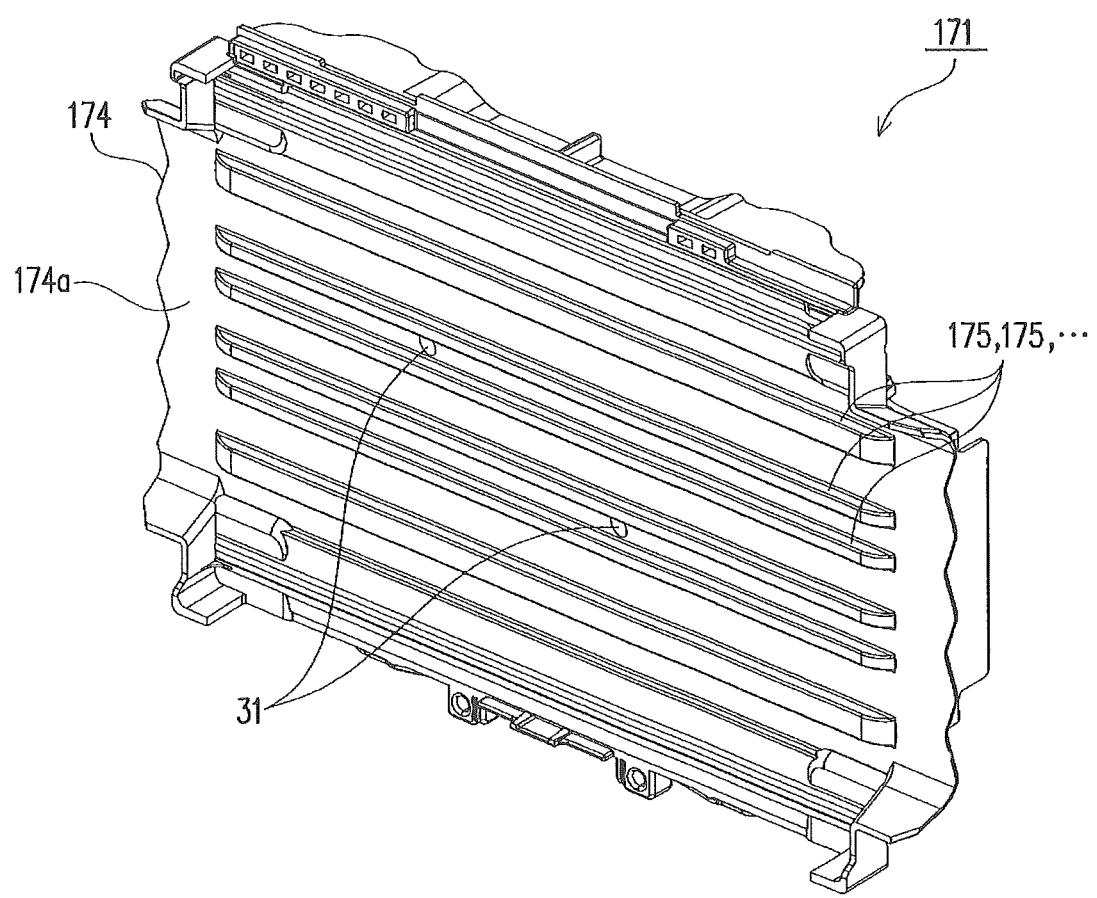

F I G . 5
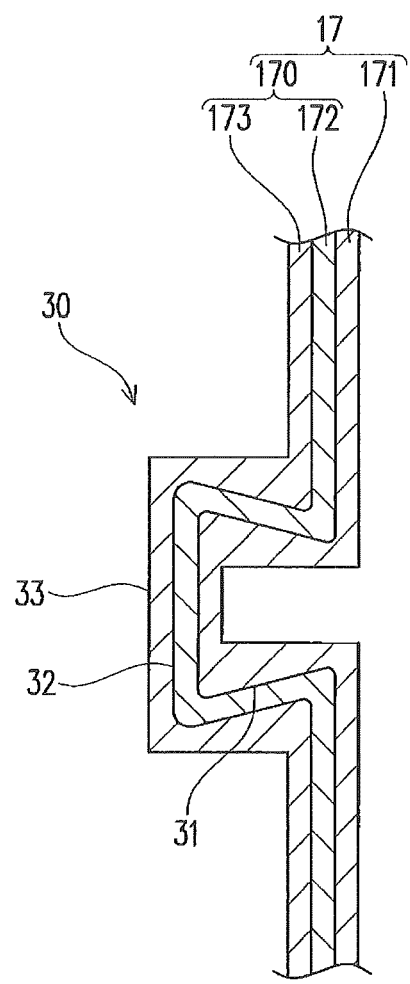

ELECTRIC STORAGE APPARATUS, AND METHOD FOR PRODUCING ELECTRIC STORAGE APPARATUS

CROSS-REFERENCE TO RELATED APPLICATION

This application claims the benefit of Japanese Patent Application No. 2013-181516, filed on Sep. 2, 2013, which is incorporated herein by reference.

FIELD

The present invention relates to an electric storage apparatus that includes an electric storage device, and a method for producing an electric storage apparatus.

BACKGROUND

An electric storage apparatus provided with a plurality of electric storage devices is used, for example, for electric cars, because of the requirement for a high-capacity power source. As shown in FIG. 11, the electric storage apparatus of this type includes a plurality of electric storage devices 120 aligned in a specific direction and a pair of end members 102 that sandwich the plurality of electric storage devices 120 (see JP 2008-130374 A). The end members 102 are plate members made of resin. In such an electric storage apparatus 100, the plurality of electric storage devices 120 are firmly fixed to each other by increasing the plate thickness so as to sufficiently ensure the strength of the end members 102.

In recent years, there is a demand for a reduction in size of electric storage apparatuses. However, the size of the electric storage apparatus 100 increases if the strength of the end members 102 is ensured by increasing the plate thickness of the end members 102 as in the electric storage apparatus 100. Therefore, it is conceivable that the thickness of the end members 102 is reduced while ensuring the strength of the end members 102 by using molded metal plates as the end members 102.

However, in this case, insulating members made of resin have to be arranged between the electric storage devices 120 and the end members 102 for insulation, and thus the number of parts increases. As a result, operations such as the relative positioning and fixation of the parts are complicated, and the operation efficiency in assembling the electric storage apparatus 100 is reduced.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Aspects of the present invention provide an electric storage apparatus, and a method for producing an electric storage apparatus, which facilitates the assembly.

An electric storage apparatus according to an aspect of the present invention includes: an electric storage device; an insulating member arranged in alignment with the electric storage device; and a sandwiching member made of metal configured to sandwich the insulating member with the electric storage device, wherein one of the insulating member and the sandwiching member includes a recess having an opening on a first surface and having a recess-side large-diameter portion, on the bottom side, with an inner circumference larger than the opening, and the other of the insulating member and the sandwiching member includes a projection having a projection-side large-diameter portion, on the distal end side, with an outer circumference larger than the opening, the projection-side large-diameter portion being arranged inside the recess-side large-diameter portion.

BRIEF DESCRIPTION OF DRAWINGS

The foregoing and other features of the present invention will become apparent from the following description and drawings of an illustrative embodiment of the invention in which:

FIG. 4 is an enlarged perspective view of an insulating member included in the battery module;

FIG. 5 is an enlarged sectional view of a coupling part at a terminal end of a frame;

DESCRIPTION OF EMBODIMENTS

Figure 1:
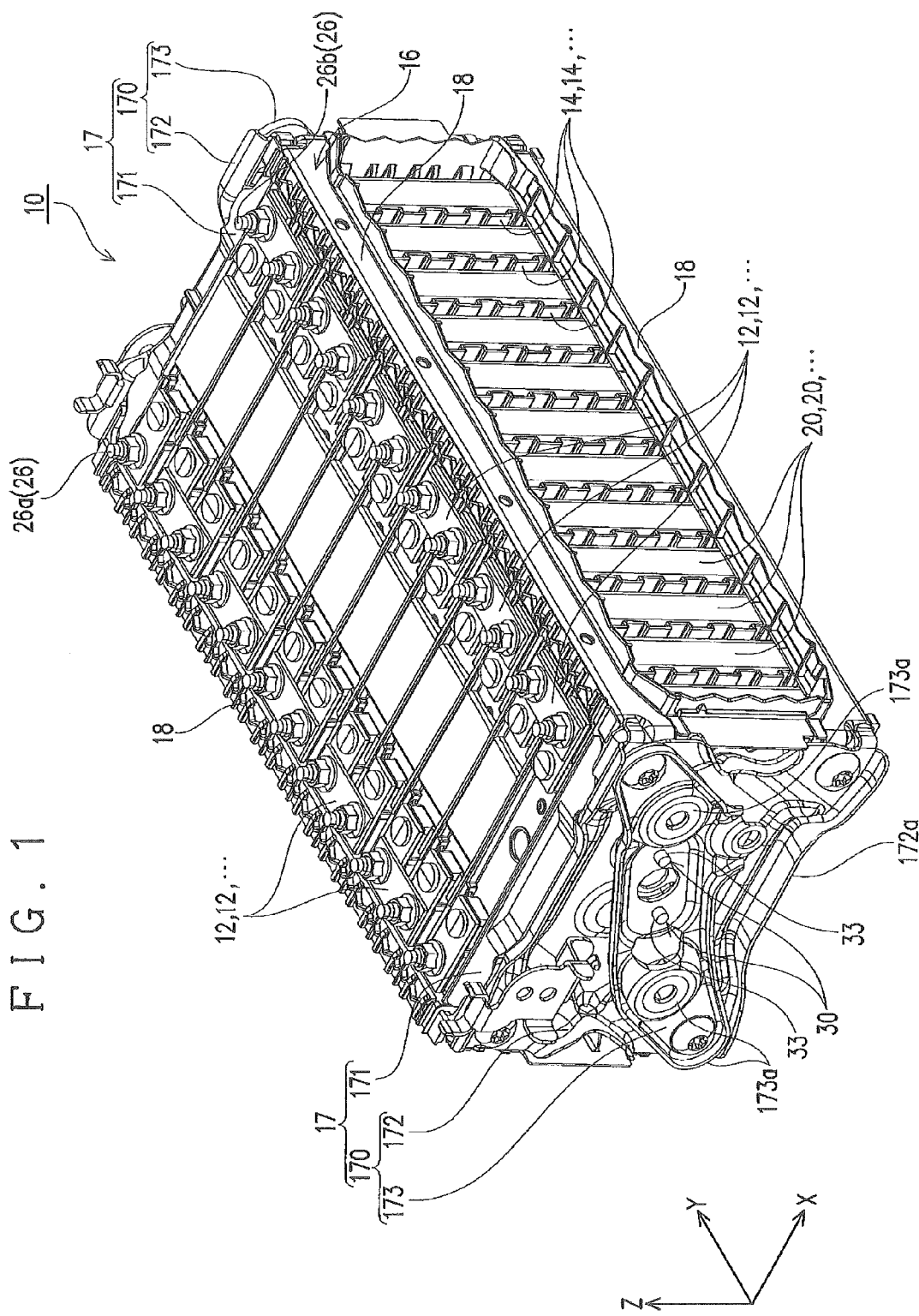
FIG. 1 is a perspective view of a battery module.

An electric storage apparatus according to an aspect includes: an electric storage device; an insulating member arranged in alignment with the electric storage device; and a sandwiching member made of metal configured to sandwich the insulating member with the electric storage device, wherein one of the insulating member and the sandwiching member includes a recess having an opening on a first surface and having a recess-side large-diameter portion, on the bottom side, with an inner circumference larger than the opening, and the other of the insulating member and the sandwiching member includes a projection-side large-diameter portion, on the distal end side, with an outer circumference larger than the opening, the projection-side large-diameter portion being arranged inside the recess-side large-diameter portion.

According to such a configuration, it is difficult for the projection-side large-diameter portion of the projection to pass through the opening of the recess, and therefore the sandwiching member and the insulating member with the projection fitted into the recess can be handled as a single part. This facilitates the assembly of the electric storage apparatus.

In the electric storage apparatus, it is preferable that the recess be provided in the sandwiching member, and the projection be provided in the insulating member.

According to such a configuration, the thickness of the insulating member can be reduced, as compared to the case where the recess is provided in the insulating member, so that the dimension from the electric storage device to the sandwiching member can be reduced. The projection of the insulating member projects toward the sandwiching member, so as to be fitted into the recess of the sandwiching member. Accordingly, the distance between the insulating member and the electric storage device is shortened, thereby allowing a reduction in size of the electric storage apparatus.

Further, in the electric storage apparatus, it is preferable that a plurality of recesses be provided, a corresponding number of projections to the number of the recesses be provided, and the projections be respectively fitted into the recesses corresponding to the projections.

According to such a configuration, the relative attitude of the insulating member and the sandwiching member engaged to each other is maintained, and thus the electric storage apparatus can be assembled more easily. That is, a plurality of recesses and a corresponding number of projections are respectively engaged with each other, so that the relative rotation of the insulating member and the sandwiching member about a single recess and a projection fitted thereinto can be prevented. As a result, the assembly operation can be further facilitated.

Further, the electric storage apparatus may have a configuration in which the recess and the projection are formed by partially pressure molding the insulating member and the sandwiching member in a stacked state at a time.

The insulating member may have a pressed recess, on an opposite surface of a surface provided with the projection, at a position corresponding to the projection.

According to such a configuration, the recess and the projection fitted into the recess are integrally formed by pressure molding, and therefore the looseness between the insulating member and the sandwiching member joined together can be suppressed. Further, the recess and the projection are formed at a time by pressure molding, and therefore the relative position can be suppressed from deviating, for example, due to manufacturing errors, as compared to the case where the recess and the projection are formed by separate steps.

Further, the electric storage apparatus may have a configuration in which a plurality of electric storage devices mentioned above are aligned in a specific direction, a pair of sandwiching members mentioned above are provided, and the pair of sandwiching members sandwich the plurality of electric storage devices from outer sides of the alignment direction.

According to such a configuration, it is difficult for the projection-side large-diameter portion of each projection to pass through the circumferential edge of the opening of each recess, and therefore the sandwiching members and the insulating members with the projections fitted into the recesses can be handled as a single part. This facilitates the assembly of the electric storage apparatus. Moreover, the electric storage apparatus with the above described configuration allows a plurality of members made of different materials (the sandwiching members made of metal and the insulating members made of resin) to be integrally handled with a simple configuration achieved, for example, by fitting the projections into the recesses, thereby achieving the ease of the assembly, while ensuring the strength by using members made of metal as the pair of sandwiching members that sandwich the plurality of electric storage devices (such as the end plates) so as to prevent an increase in size of the electric storage apparatus.

According to another aspect, a method for producing an electric storage apparatus that includes an electric storage device, an insulating member arranged in alignment with the electric storage device, and a sandwiching member made of metal configured to sandwich the insulating member with the electric storage device includes: forming, on one of the insulating member and the sandwiching member, a recess having an opening on a first surface and having a recess-side large-diameter portion, on the bottom side, with an inner circumference larger than the opening; and forming, on the other of the insulating member and the sandwiching member, a projection-side large-diameter portion, on the distal end side, with an outer circumference larger than the opening, the projection-side large-diameter portion being arranged inside the recess-side large-diameter portion.

Hereinafter, an embodiment of the present invention is described with reference to FIG. 1 to FIG. 7. In the following description, the X axis direction of FIG. 1 indicates a width direction, the Y axis direction thereof indicates a front-rear direction, and the Z axis direction thereof indicates a height direction.

Figure 2:
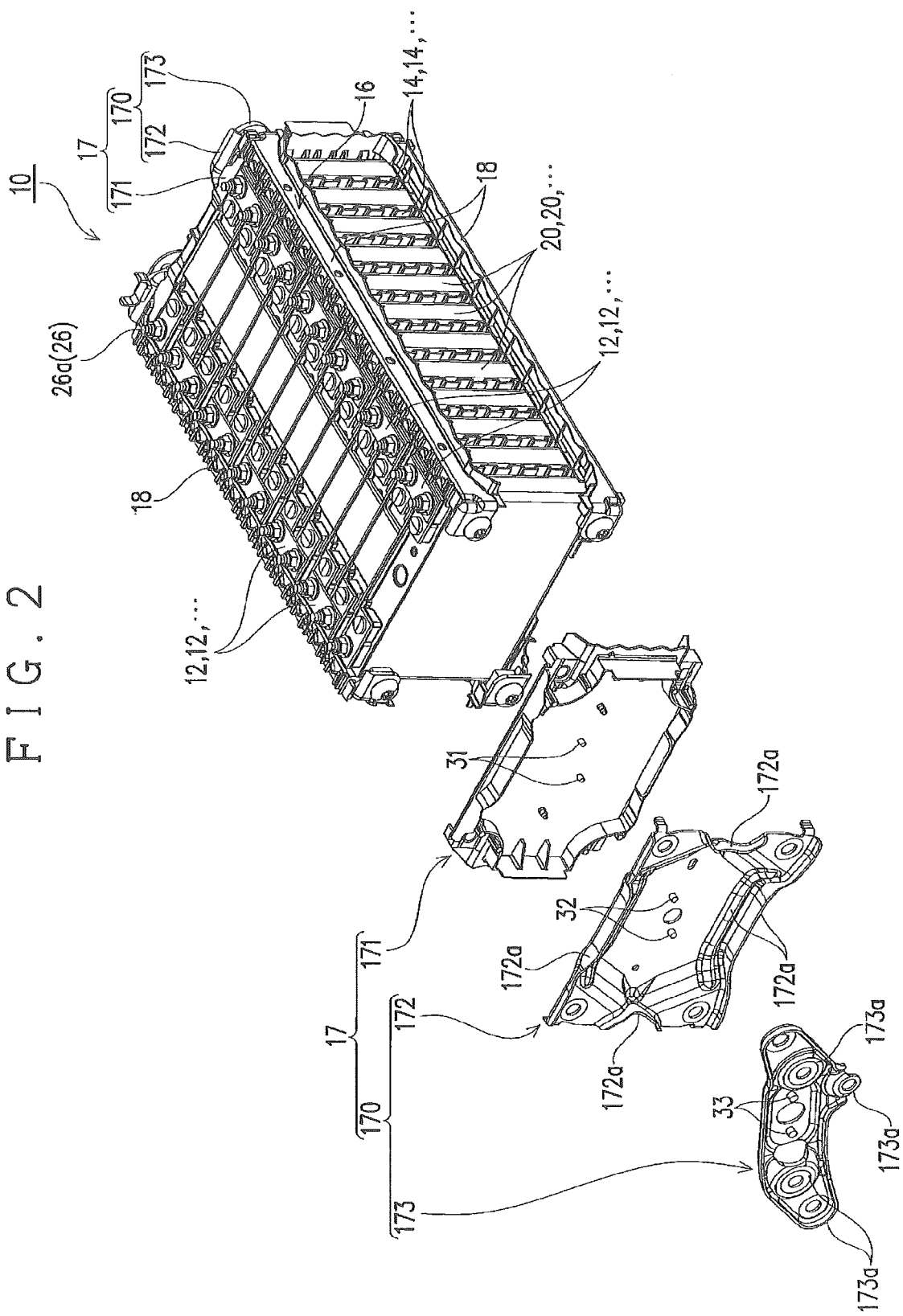
FIG. 2 is an exploded perspective view of part of the battery module.

The electric storage apparatus according to this embodiment is a battery module including battery cells as electric storage devices. As shown in FIG. 1 to FIG. 2, this battery module includes a plurality of battery cells (electric storage devices) 20, a plurality of bus bars 12, a plurality of spacers 14, and a frame 16.

The plurality of battery cells 20 are arranged in alignment in a specific direction (front-rear direction in this embodiment). The plurality of battery cells 20 have the same structure and the same shape. Hereinafter, one of the battery cells 20 is described.

Figure 3:
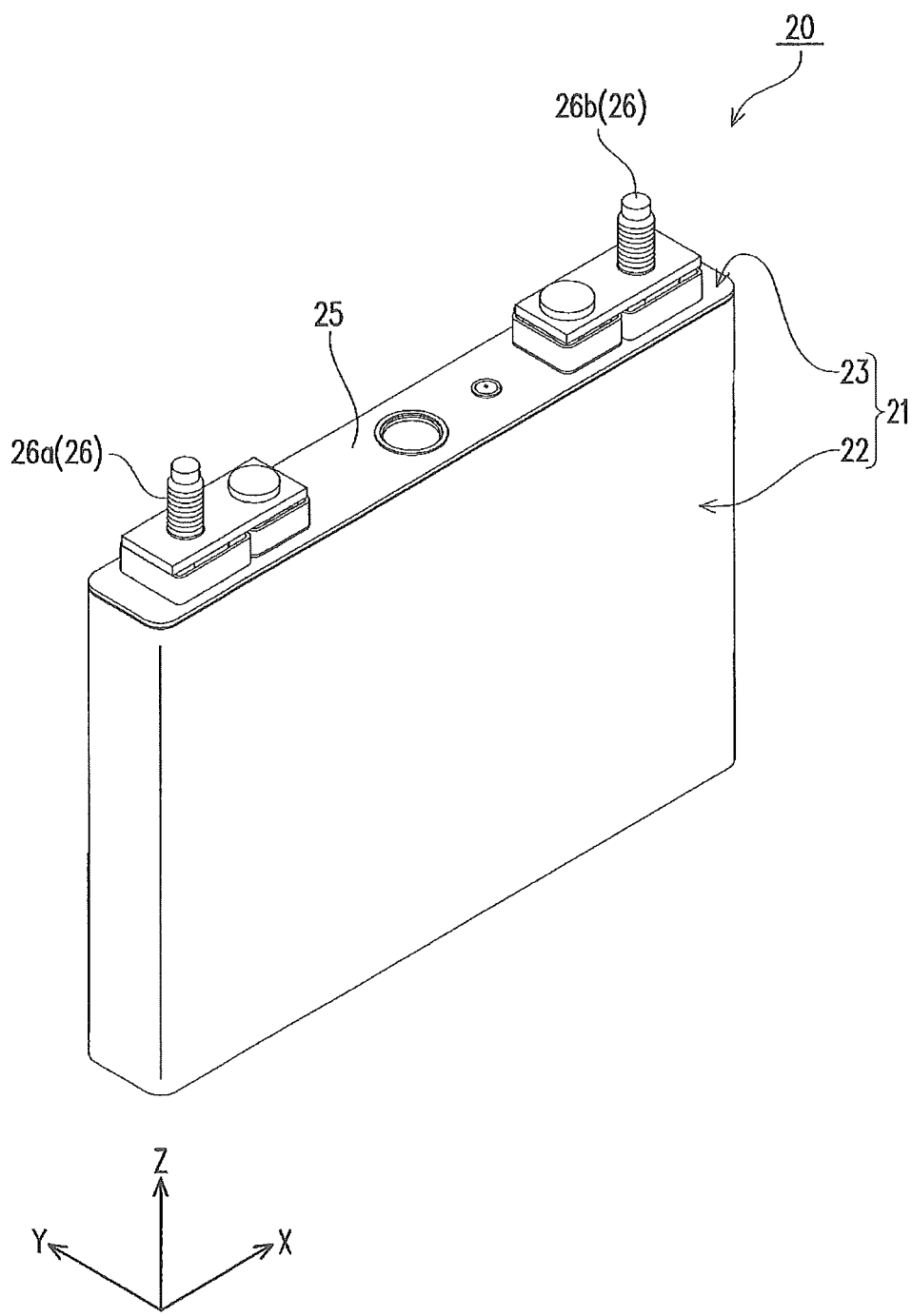
FIG. 3 is a perspective view of a battery cell included in the battery module.

As shown in FIG. 3, the battery cell 20 includes an electrode assembly (not shown), and a case 21 housing the electrode assembly.

The case 21 has a case body 22 and a cover 23, and houses the electrode assembly in an internal space surrounded by the case body 22 and the cover 23. The case body 22 has a bottomed rectangular cylindrical shape flattened in the width direction. The cover 23 has a cover plate 25 configured to close an opening of the case body 22, and a pair of external terminals 26 attached to the cover plate 25. One of the pair of external terminals 26 is a positive electrode-external terminal 26a connected to a positive electrode of the electrode assembly, and the other external terminal is a negative electrode-external terminal 26b connected to a negative electrode of the electrode assembly.

Each of the bus bars 12 electrically connects the external terminals 26 of adjacent battery cells 20 that correspond to each other (specifically, the positive electrode-external terminal 26a of one of the battery cells 20 and the negative electrode-external terminal 26b of the other of the battery cells 20). The bus bar 12 of this embodiment, for example, is a rectangular plate member made of metal.

Returning to FIG. 1 to FIG. 2, each of the spacers 14 is arranged between adjacent battery cells 20. The spacer 14 is formed of a synthetic resin and has insulating properties. The spacer 14 of this embodiment is formed to have a longitudinal cross section of a rectangular wave shape. The spacer 14 having such a shape is arranged between the adjacent battery cells 20, thereby allowing the air to circulate between the battery cells 20.

The frame 16 holds the plurality of battery cells 20 and the plurality of spacers 14 arranged between the battery cells 20 so as to package them. The frame 16 has a pair of terminal ends 17 arranged at a distance in the front-rear direction, and a plurality (four in an example of this embodiment) of coupling members 18, extending in the front-rear direction, configured to couple the pair of terminal ends 17 to each other.

The pair of terminal ends 17 are coupled to each other by the plurality of coupling members 18, thereby sandwiching the plurality of battery cells 20 in the front-rear direction so as to fix them. Each of the terminal ends 17 has a sandwiching member 170 and an insulating member 171.

The sandwiching members 170 are composed of a plurality of molded metal plates and arranged on the outer sides of the battery cells 20 that are located on the outermost sides of the plurality of battery cells 20 in the front-rear direction. That is, in the front-rear direction (in the alignment direction of the battery cells 20), one of the sandwiching members 170 is arranged on the front side of the battery cell 20 that is located on the most front side, and the other of the sandwiching members 170 is arranged on the rear side of the battery cell 20 that is located on the most rear side. Each of the sandwiching members 170 of this embodiment has an end plate 172 and a reinforcing member 173.

The end plate 172 expands in a direction orthogonal to the front-rear direction, and has a size and a shape such that it covers substantially the whole battery cell 20 in front view. The end plate 172 is a molded metal plate that is formed using an iron-based metal material and is subjected to zinc metal plating. A plurality of reinforcing parts 172a, such as ribs, projections, and bent portions, are formed on the end plate 172.

The end plate 172 has a plurality (two in an example of this embodiment) of second engaging parts 32 in a region overlapping the insulating member 171 and the reinforcing member 173 in the front-rear direction. The second engaging parts 32 constitute part of coupling parts 30 configured to couple the end plate 172, the reinforcing member 173, and the insulating member 171 to one another. The coupling parts 30 and the second engaging parts 32 will be described in detail below.

The reinforcing member 173 expands in a direction orthogonal to the front-rear direction, and has a size and a shape such that it covers part of the end plate 172 in front view. The reinforcing member 173 is a molded metal plate that is formed using an iron-based metal material and is subjected to zinc metal plating. The reinforcing member 173 of this embodiment extends along a diagonal line of the end plate 172. A plurality of reinforcing parts 173a, such as ribs, projections, and bent portions, are formed on the reinforcing member 173.

The reinforcing member 173 has a plurality (two in an example of this embodiment) of third engaging parts (recesses) 33 in a region overlapping the insulating member 171 and the end plate 172 in the front-rear direction (specifically, at positions corresponding to the second engaging parts 32 of the end plate 172). The third engaging parts 33 constitute part of the coupling parts 30. The third engaging parts 33 will be described in detail below.

In the end plate 172 and the reinforcing member 173 configured as above, the arrangement positions, shapes, etc., of the respective reinforcing parts 172a and 173a are set so that the end plate 172 and the reinforcing member 173 have a specific strength when they are coupled (joined) to each other in a stacked state in the front-rear direction. That is, it is possible to ensure a sufficient strength while suppressing the thickness (dimension in the front-rear direction) of the sandwiching member 170 by stacking the plurality of molded plates 172 and 173 on which the plurality of reinforcing parts 172a and 173a are formed in the front-rear direction so as to form the sandwiching member 170, as described above.

The insulating members 171 are formed of a resin, and have insulating properties. The insulating members 171 are arranged between the sandwiching members 170 and the battery cells 20 located on the outermost sides in the front-rear direction. Specifically, one of the insulating members 171 is sandwiched between the sandwiching member 170 arranged on the front side and the battery cell 20 on the most front side, and the other of the insulating members 171 is sandwiched between the sandwiching member 170 arranged on the rear side and the battery cell 20 on the most rear side.

Each of the insulating members 171 expands in a direction orthogonal to the front-rear direction, and has a size and a shape such that it covers the whole battery cell 20 in front view. As shown also in FIG. 4, the insulating member 171 has a body 174 as a plate portion, and a plurality of projecting ridges 175 that project from a surface 174a of the body 174 facing the battery cell 20 and are aligned in parallel to each other at intervals in the up-down direction. Further, the body 174 has a plurality (two in an example of this embodiment) of first engaging parts (projections) 31 in a region overlapping the end plate 172 and the reinforcing member 173 in the front-rear direction (specifically, at positions corresponding to the second engaging parts 32 of the end plate 172 and the third engaging parts 33' of the reinforcing member 173). The first engaging parts 31 constitute part of the coupling parts 30. The first engaging parts 31 will be described in detail below.

The end plate 172, the reinforcing member 173, and the insulating member 171 configured as above are coupled (joined) to one another by a plurality (two in an example of this embodiment) of coupling parts 30 so as to be integrated. As shown in FIG. 5, the coupling parts 30 are formed at portions where the insulating member 171, the end plate 172, and the reinforcing member 173 are stacked in tight contact with one another in the front-rear direction. The coupling parts 30 include the aforementioned first engaging parts 31 of the insulating member 171, the aforementioned second engaging parts 32 of the end plate 172, and the aforementioned third engaging parts 33 of the reinforcing member 173.

Each of the first engaging part 31 has a shape in which the surface 174a of the body 174 of the insulating member 171 facing the battery cell 20 is recessed, and the back surface of the recessed surface projects. The first engaging part 31 is fitted into the second engaging part 32.

Specifically, the first engaging part 31 has an annular cross section at positions in the front-rear direction except for its distal end, and the outer diameter thereof increases from the base to the distal end. That is, in the first engaging part 31, the outer circumference (outer diameter) of the distal end is larger than the outer circumference (outer diameter) of the base.

Each of the second engaging parts 32 has a shape in which a surface facing the insulating member 171 is recessed, and the back surface of the recessed surface projects, at a position of the end plate 172 overlapping the first engaging part 31 in the front-rear direction. In the second engaging part 32, the first engaging part 31 is fitted into the recessed portion, and the projecting portion is fitted into the third engaging part 33.

Specifically, the second engaging part 32 has an annular cross section at positions in the front-rear direction except for its distal end, and the outer diameter thereof increases from the base to the distal end. That is, in the second engaging part 32, the outer circumference (outer diameter) of the distal end is larger than the outer circumference (outer diameter) of the base, and the inner circumference of the distal end (internal diameter) is larger than the inner circumference (internal diameter) of the base. Further, the inner circumference (internal diameter) of the base of the second engaging part 32, that is, the opening of the recessed portion is smaller than the outer circumference (outer diameter) of the distal end of the first engaging part 31. In this embodiment, the recessed portion of the second engaging part 32 is in tight contact with the first engaging part 31 fitted into the recessed portion.

Each of the third engaging parts 33 has a shape in which a surface facing the end plate 172 is recessed, and the back surface of the recessed surface projects, at a position of the reinforcing member 173 overlapping the second engaging part 32 in the front-rear direction. In the third engaging part 33, the second engaging part 32 is fitted into the recessed portion.

Specifically, the third engaging part 33 has an annular cross section at positions in the front-rear direction except for its distal end, and the outer diameter thereof increases from the base to the distal end. That is, in the third engaging part 33, the outer circumference (outer diameter) of the distal end is larger than the outer circumference (outer diameter) of the base, and the inner circumference of the distal end (internal diameter) is larger than the inner circumference (internal diameter) of the base. Further, the inner circumference (internal diameter) of the base of the third engaging part 33, that is, the opening of the recessed portion is smaller than the outer circumference (outer diameter) of the distal end of the second engaging part 32. In this embodiment, the recessed portion of the third engaging part 33 is in tight contact with the second engaging part 32 fitted into the recessed portion.

Each of the coupling parts 30 that is composed of the first to third engaging parts 31 to 33 configured as above is formed by partially pressing (pressure molding) the insulating member 171, the end plate 172, and the reinforcing member 173 in a stacked state from the insulating member 171 toward the reinforcing member 173. Specifically, it is formed as follows.

Figure 6:
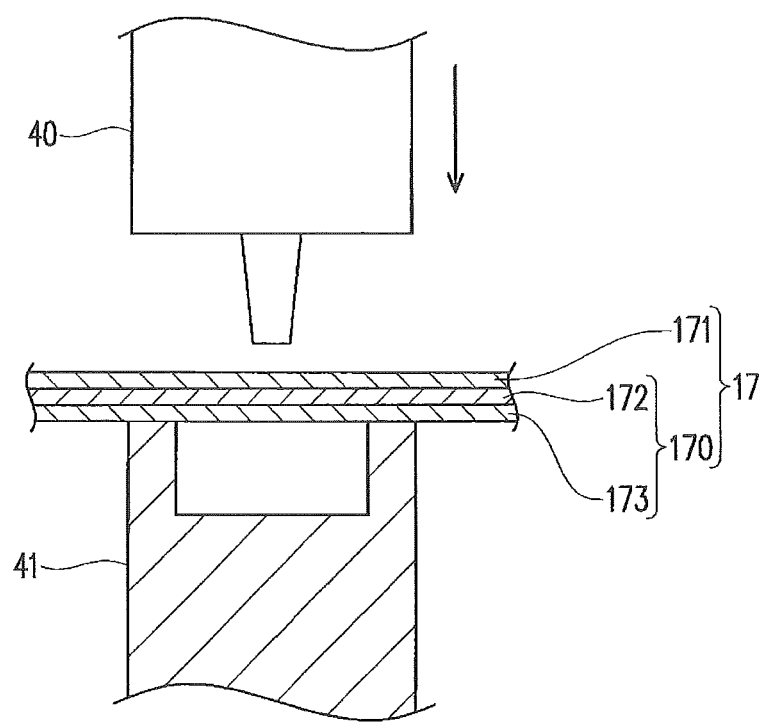
FIG. 6 is a view explaining a forming step of the coupling part, showing the state before pressing.
Figure 7:
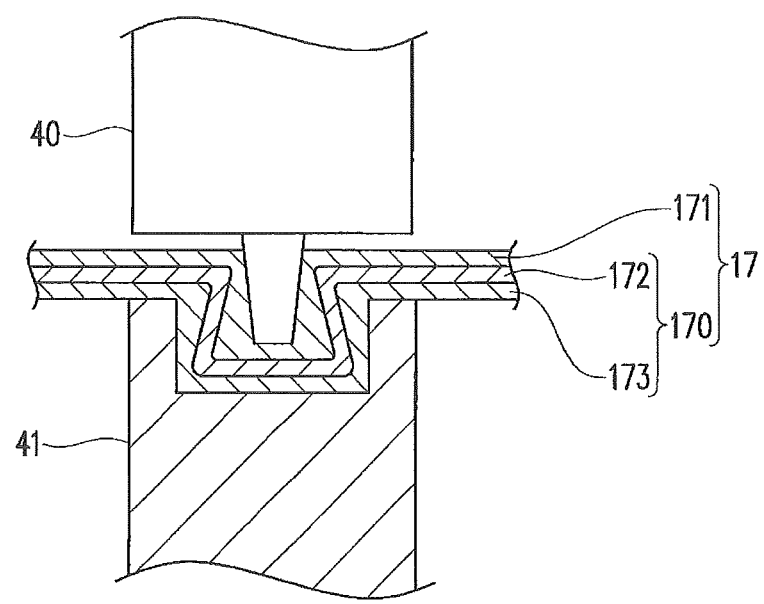
FIG. 7 is a view explaining the forming step of the coupling part, showing the state during pressing.

As shown in FIG. 6, the insulating member 171, the end plate 172, and the reinforcing member 173 are sequentially stacked. Subsequently, as shown in FIG. 7, a pair of plastic molds 40 and 41 sandwich part of the coupling part 30 (planned formation portion) of the insulating member 171, the end plate 172, and the reinforcing member 173 in a stacked state so as to press it. This allows plastic deformation of the pressed portions of the members (the insulating member 171, the end plate 172, and the reinforcing member 173), so that the coupling part 30 is formed. That is, the first to third engaging parts 31 to 33 are integrally formed while being engaged with one another at a time by press molding.

According to a battery module 10 configured as above, in the coupling part 30, it is difficult for the distal end of the first engaging part 31 fitted into the second engaging part 32 to pass through the opening of the second engaging part 32, and it is difficult for the distal end of the second engaging part 32 fitted into the third engaging part 33 to pass through the opening of the third engaging part 33. Therefore, the insulating member 171, the end plate 172, and the reinforcing member 173 coupled (joined) to one another can be handled as a single part. This can facilitate the assembly of the battery module 10. That is, the battery module 10 of this embodiment allows a plurality of members made of different materials (the end plate 172 and the reinforcing member 173 made of metal, and the insulating member 171 made of resin) to be integrally handled with a simple configuration such as the first to third engaging parts 31 to 33, thereby achieving the ease of assembly, while ensuring the strength by forming the pair of sandwiching members 170 (the end plate 172 and the reinforcing member 173) that sandwich the plurality of battery cells 20 using thin members (molded plates) made of metal so as to prevent an increase in size of the battery module 10.

Further, the battery module 10 of this embodiment has a configuration in which the first engaging part 31 of the insulating member 171 is fitted into the second engaging part 32 of the sandwiching member 170, thereby allowing a reduction in thickness of the insulating member 171.

For example, in a configuration in which a projection (second engaging part) provided in the sandwiching member 170 is fitted into a recess (first engaging part) provided in the insulating member 171, a coupling part is formed so as to project from the surface 174a of the insulating member 171 facing the battery cell 20. Therefore, the air flow through the passage formed by the plurality of projecting ridges 175 for allowing the air to circulate between the battery cell 20 and the body 174 of the insulating member 171 is inhibited by the coupling part projecting on the battery cell 20 side. However, as in this embodiment, the configuration in which the first engaging part 31 of the insulating member 171 is fitted into the second engaging part 32 of the sandwiching member 170 can prevent the coupling part from projecting from the surface 174a of the insulating member 171 facing the battery cell 20.

Further, in the battery module 10 of this embodiment, the plurality of coupling parts 30 are provided for each of the terminal ends 17, and therefore the relative attitude of the insulating member 171, the end plate 172, and the reinforcing member 173 that are coupled to one another is maintained. This further facilitates the assembly of the battery module 10. That is, the relative rotation of the members (the insulating member 171, the end plate 172, and the reinforcing member 173) about a single coupling part 30 can be prevented by respectively engaging the plurality of third engaging parts 33 with a corresponding number of the second engaging parts 32, and by respectively engaging the plurality of second engaging parts 32 with a corresponding number of the first engaging parts 31. This eliminates the need for an operation to adjust the relative attitude of the insulating member 171, the end plate 172, and the reinforcing member 173 in the assembly operation of the battery module 10.

Further, the battery module 10 of this embodiment can suppress the looseness between the joined members 171, 172, and 173, since the first to third engaging parts 31 to 33 are integrally formed by press molding. Further, the engaging parts 31, 32, and 33 constituting the common coupling part 30 are formed at a time by press molding, and therefore the relative position can be suppressed from deviating, for example, due to manufacturing errors, as compared to the case where the engaging parts 31, 32, and 33 are respectively formed by separate steps for the members 171, 172, and 173.

It is a matter of course that the electric storage apparatus of the present invention is not limited to the above described embodiments, and various modifications can be made without departing from the gist of the present invention.

In the above described embodiment, the sandwiching member (member made of metal) 170 and the insulating member (member made of resin) 171 are coupled to each other by the first engaging parts 31 and the second engaging parts 32 that are formed while being engage with each other at a time by press molding. However, there is no limitation to such a configuration. For example, members made of different materials may be joined (coupled) to each other by forming engaging parts in each of a member made of metal and a member made of resin, and thereafter engaging the corresponding engaging parts with each other (that is, by pushing the projection of one member into the recess of the other member).

Figure 8:
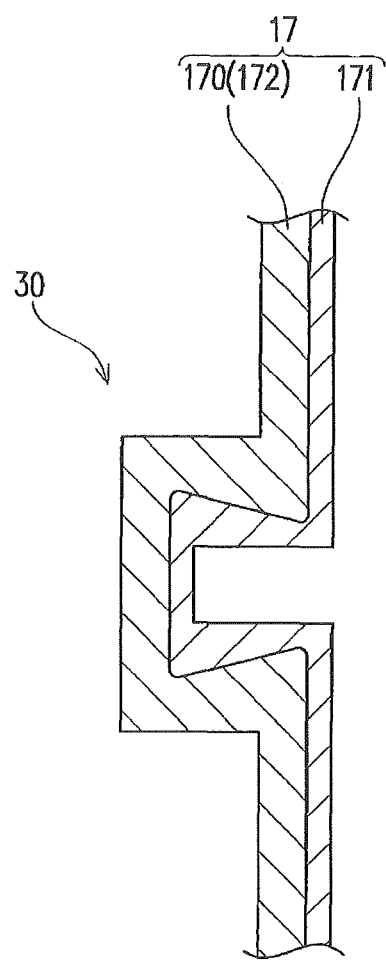
FIG. 8 is an enlarged sectional view of a coupling part at a terminal end of a frame according to another embodiment.

Further, the sandwiching member (member made of metal) 170 of the above described embodiment has a configuration in which the reinforcing member 173 is coupled to the end plate 172. However, there is no limitation to such a configuration. For example, the reinforcing member 173 may be eliminated as long as the end plate 172 has a sufficient strength. That is, the sandwiching member 170 may be composed only of the end plate 172. In this case, for example, as shown in FIG. 8, a recess having a recess-side large-diameter portion is provided in the end plate 172 (170), and a projection having a projection-side large-diameter portion is provided in the insulating member (resin member) 171.

Further, in the battery module 10 of the above described embodiment, the joint using the first engaging parts (projections) 31 and the second engaging parts (recesses) 32 is performed in the terminal ends 17 that sandwich the plurality of battery cells 20 from the front and rear sides, in order to join the resin member (insulating member) 171 to the metal member (sandwiching member) 170. However, the joint may be performed in another portion of the battery module 10.

Figure 9:
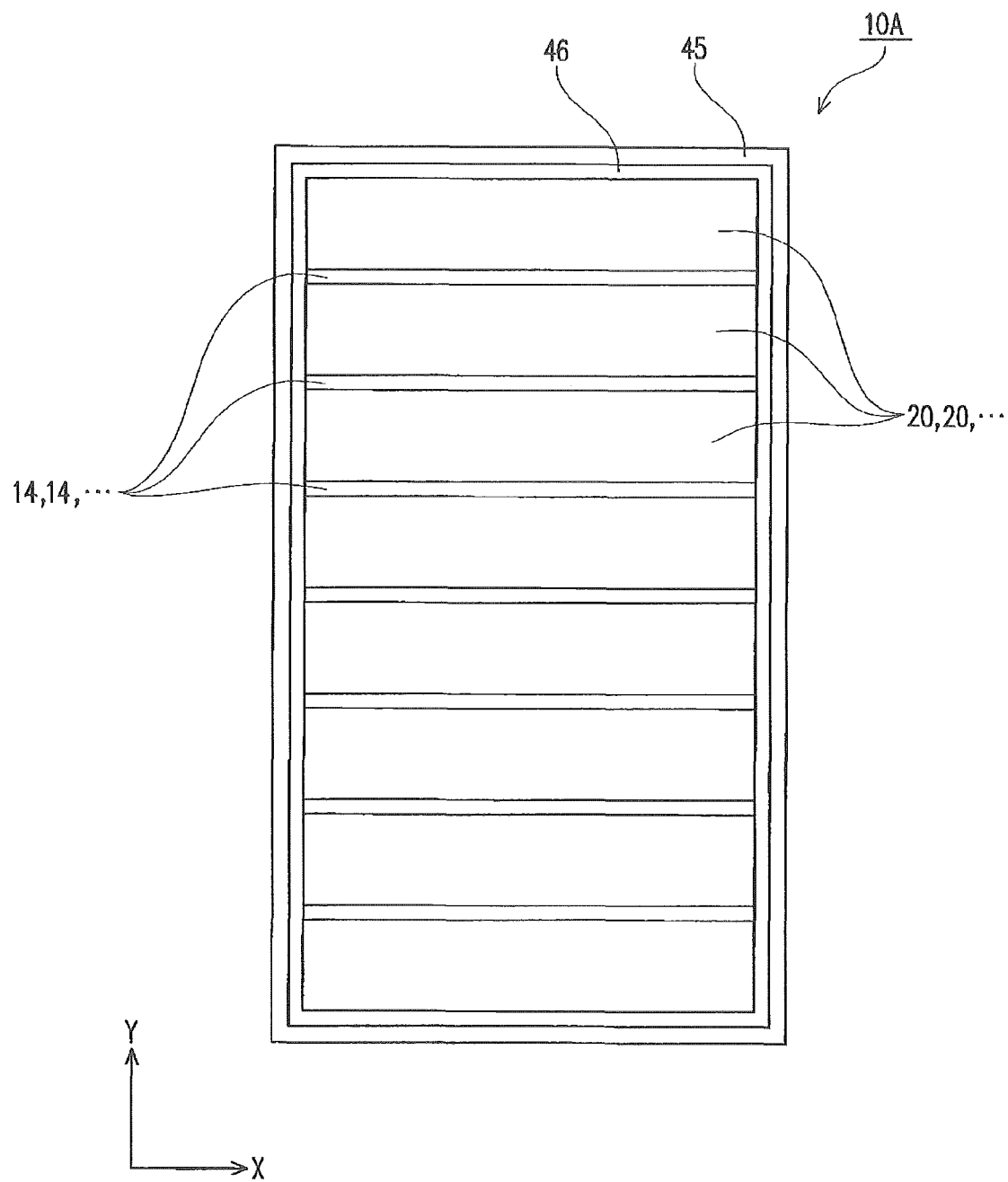
FIG. 9 is a schematic diagram of a battery module according to another embodiment.

For example, as an electric storage apparatus 10A shown in FIG. 9, in the case where the plurality of battery cells 20 are housed in a case 45 made of metal, the aforementioned joint using the recess and the projection may be used for joining the sidewalls on the left and right sides, the top wall, and the bottom wall of the case 45 to resin insulating members 46 arranged between the case 45 and the plurality of battery cells 20.

Further, in the case where the spacer 14 arranged between the battery cells 20 is composed of a metal member and a resin member, the aforementioned joint using the recess and the projection may be used for joining the metal member to the resin member.

Figure 10:
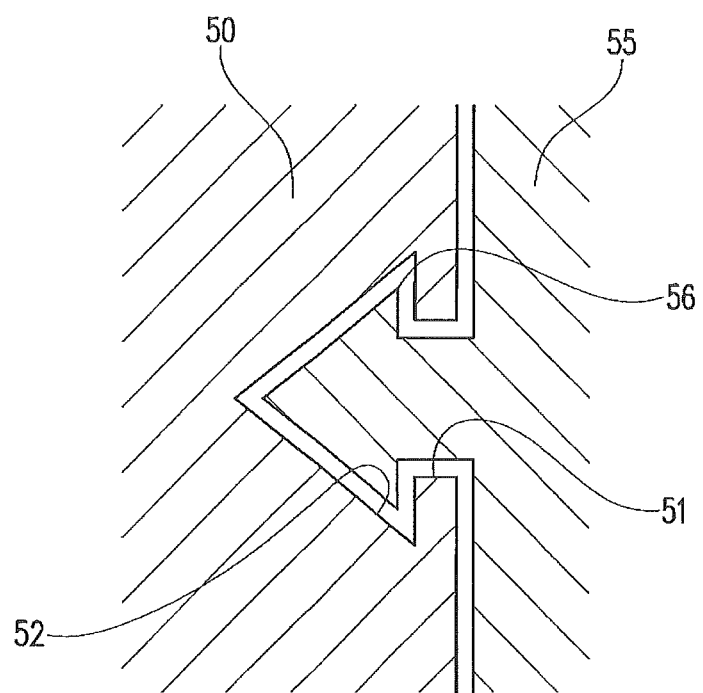
FIG. 10 is a sectional view of a coupling part according to still another embodiment.
Figure 11:
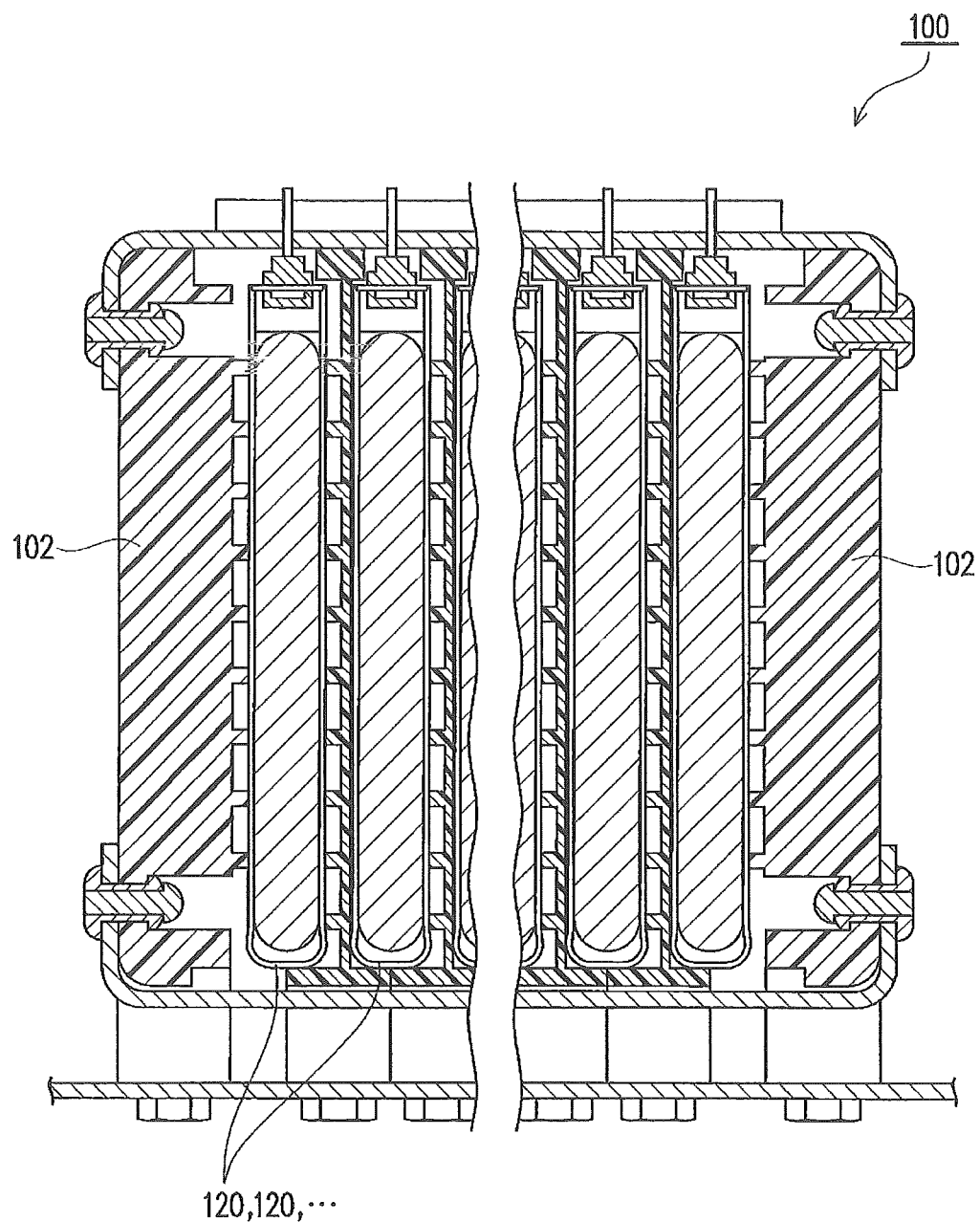
FIG. 11 is a schematic sectional view of a conventional electric storage apparatus.

Further, the first engaging part 31 of the above described embodiment has a surface on the sandwiching member 170 side (outer circumferential surface of the projection) with a diameter increasing toward the distal end, and the second engaging part 32 has a surface on the insulating member 171 side (inner circumferential surface of the recess) with a diameter increasing toward the bottom side. However, there is no limitation to such shapes. As shown in FIG. 10, the configuration may be such that the recess (engaging part) of a member 50 that is one of a resin member and a metal member has a recess-side large-diameter portion 52, on the bottom side, with an inner circumference larger than an opening 51, and the projection (engaging part) of a member 55 that is the other of the resin member and the metal member has a projection-side large-diameter portion 56, on the distal end side, with an outer circumference larger than the opening 51 of the recess, which is arranged inside the recess-side large-diameter portion 52. According to such a configuration, the projection is fitted into the recess, thereby allowing the metal member 50 (or 55) and the resin member 55 (or 50) to be joined to each other. The shapes of the recess and the projection are not specifically limited to those shown in FIG. 9.

Further, the number of the battery cells (electric storage devices) 20 included in the electric storage apparatus (battery module) is not limited. For example, a single electric storage device 20 may be included in the electric storage apparatus.

The electric storage apparatus and the method for producing storage apparatus of this embodiment are as described above. However, the present invention is not limited to the above described embodiments, and the design can be appropriately modified within the scope intended by the present invention. The operational advantage of the present invention is also not limited to the foregoing embodiments.

The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

What is claimed is:

1. An electric storage apparatus, comprising:
an electric storage device;
an insulating member arranged in alignment with the electric storage device; and
a sandwiching member comprising a metal configured to sandwich the insulating member with the electric storage device such that a surface of the insulating member faces the electric storage device and another surface of insulating member, which opposes the surface of the insulating member, faces the sandwiching member,
wherein one of the insulating member and the sandwiching member includes a recess including an opening on a surface, an inner circumference on a bottom of the recess being larger than a diameter of the opening, and
wherein an other of the insulating member and the sandwiching member includes a projection located inside the recess, a diameter of the projection increasing toward the distal end of the projection such that an outer circumference of the projection is larger than the diameter of the opening.

2. The electric storage apparatus according to claim 1, wherein the recess is provided in the sandwiching member, and the projection is provided in the insulating member.

3. The electric storage apparatus according to claim 2, wherein the insulating member includes a pressed recess, on an opposite surface of a surface provided with the projection, at a position corresponding to the projection.

4. The electric storage apparatus according to claim 1, wherein a plurality of the recesses are provided, a corresponding number of the projections are provided, and the projections are respectively fitted into the recesses that correspond to the projections.

5. The electric storage apparatus according to claim 1, wherein the recess and the projection are formed by partially pressure molding the insulating member and the sandwiching member in a stacked state at a same time.

6. The electric storage apparatus according to claim 1, wherein a plurality of the electric storage devices are aligned in a specific direction,
wherein a pair of the sandwiching members are provided, and
wherein the pair of sandwiching members sandwich the plurality of electric storage devices from outer sides of the specific direction.

7. The electric storage apparatus according to claim 1, wherein the recess is provided in the insulating member, and the projection is provided in the sandwiching member.

8. The electric storage apparatus according to claim 1, wherein, in a stacking direction of an arrangement of the sandwiching member, the insulating member, and the electric storage device, the surface of the insulating member covers an entirety of a surface of the electric storage device.

9. The electric storage apparatus according to claim 8, wherein, in the stacking direction of the arrangement of the sandwiching member, the insulating member, and the electric storage device, a surface of the sandwiching member covers an entirety of said another surface of the insulating member.

10. The electric storage apparatus according to claim 1, wherein the sandwiching member includes:
an end plate including a surface that faces said another surface of the insulating member; and
a reinforcement member attached to the end plate such that a surface of the reinforcement member faces another surface of the end plate.

11. The electric storage apparatus according to claim 1, wherein the insulating member longitudinally extends orthogonal to a stacking direction of an arrangement of the sandwiching member, the insulating member, and the electric storage device.

12. The electric storage apparatus according to claim 1, wherein the sandwiching member includes:
an end plate including a surface that faces a surface of the insulating member; and
a reinforcement member attached to the end plate such that a surface of the reinforcement member faces another surface of the end plate.

13. An electric storage apparatus, comprising:
a plurality of electric storage devices aligned in an arrangement direction;
an insulating member longitudinally extending orthogonal to the arrangement direction to cover an outer surface of the plurality of electric storage devices; and
a sandwiching member comprising a metal, the insulating member longitudinally extending between the sandwiching member and the plurality of electric storage devices such that, in the arrangement direction, the sandwiching member and the outer surface of the plurality of electric storage devices sandwich the insulating member,
wherein one of the insulating member and the sandwiching member includes a recess including an opening on a surface thereof, an inner circumference on a bottom of the recess being larger than a diameter of the opening, and
wherein an other of the insulating member and the sandwiching member includes a projection located inside the recess, a diameter of the projection increasing toward the distal end of the projection such that an outer circumference of the projection is larger than the diameter of the opening.

14. The electric storage apparatus according to claim 13, wherein the recess is provided in the insulating member, and the projection is provided in the sandwiching member.

15. The electric storage apparatus according to claim 13, wherein, in the arrangement direction, a surface of the insulating member covers an entirety of the outer surface of the plurality of electric storage devices.

16. The electric storage apparatus according to claim 15, wherein, in the arrangement direction, a surface of the sandwiching member covers an entirety of another surface of the insulating member that opposes the surface of the insulating member.

* * * * *